(12) United States Patent
Gillmor

(10) Patent No.: US 8,737,095 B2
(45) Date of Patent: May 27, 2014

(54) OPTO-COUPLED SENSING

(75) Inventor: Colin Gillmor, Limerick (IE)

(73) Assignee: Texas Instruments (Cork) Limited, Dublin (IE)

( * ) Notice: Subject to any disclaimer, the term of this patent is extended or adjusted under 35 U.S.C. 154(b) by 498 days.

(21) Appl. No.: 13/096,705

(22) Filed: Apr. 28, 2011

(65) Prior Publication Data

US 2011/0292692 A1 Dec. 1, 2011

(51) Int. Cl.
*H02M 3/335* (2006.01)

(52) U.S. Cl.
USPC ........................................ 363/21.15

(58) Field of Classification Search
CPC .................. H02M 3/33523; H02M 2001/0032
USPC .......... 363/16, 20, 21.01, 21.07, 21.12, 21.15
See application file for complete search history.

(56) References Cited

U.S. PATENT DOCUMENTS

| | | | | |
|---|---|---|---|---|
| 6,104,622 | A * | 8/2000 | Shin ............................ | 363/21.07 |
| 7,697,309 | B2 * | 4/2010 | Bao et al. .................... | 363/56.11 |
| 8,077,487 | B2 * | 12/2011 | Huynh ........................ | 363/21.15 |
| 2011/0255311 | A1 * | 10/2011 | Hsu et al. ................... | 363/21.15 |

FOREIGN PATENT DOCUMENTS

| WO | WO02061933 | 8/2002 |
|---|---|---|
| WO | WO2011051824 | 5/2011 |

OTHER PUBLICATIONS

GB Search Report mailed Oct. 21, 2011.

* cited by examiner

*Primary Examiner* — Matthew Nguyen
(74) *Attorney, Agent, or Firm* — William B. Kempler; Wade J. Brady III; Frederick J. Telecky, Jr.

(57) ABSTRACT

The present invention provides an isolated regulating power converter with opto-coupled feedback of output (Vo) with respect to a reference level (Vset) for regulation to a converter controller. The sense of the feedback signal is such that the opto-coupler LED is ON when Vo<Vset and OFF when Vo>Vset with the effect that the LED current and power loss is zero during the times when Vo>Vset, as is normal case for many controllers at low or no load. This saves power under such circumstances. Additionally, as the LED does not load the output during this time, the proportion of time for which Vo>Vset is increased, meaning that the timing at which the switch must again be on to meet demand is extended, producing a further power saving.

17 Claims, 2 Drawing Sheets

OPTO-COUPLED SENSING

CROSS-REFERENCE TO RELATED APPLICATIONS

This patent application claims priority from Provisional Great Britain Patent Application No. 1007177.7, filed Apr. 30, 2010, which is incorporated herein by reference in its entirety.

FIELD OF THE INVENTION

The present invention relates to the opto-coupling of signals as may be employed when electrical isolation between transmission and reception of a signal is required. In a power converter, for example, electrical isolation between input (120V AC line, 240V AC Mains or line or mains derived unregulated DC, for example) and output (5V DC, 19V DC Regulated) is often mandatory. The main conversion circuit may provide isolation by virtue of a transformer however it is likely that some form of feedback will be required from output (transformer secondary) to input (transformer primary) so that control circuitry on the primary side may effect regulation. Isolation in this path is also necessary and one way to achieve it is with an opto-coupler. There are many opto-coupler devices commercially available for numerous and diverse applications. For a power converter, a suitable device would be exemplified by the MOC205 and the H11A817 from Fairchild Semiconductor.

BACKGROUND OF THE INVENTION

Unfortunately, one consequence of replacing a wired connection with an opto-coupled connection for the purpose of isolation is that the opto device consumes power.

Next generation AC/DC laptop adapters need to meet increasingly stringent limits on standby power dissipation mandated by the European Commission's EcoDesign Directive, Energy Star specifications and others and also commercial specifications set by equipment manufacturers. Currently, designs meeting a 30 mW standby power limit are being proposed.

Achieving such low standby power dissipation requires that every step be taken to reduce un-necessary power losses. This includes steps to reduce for example, bias power, voltage sensing losses and control feedback system losses. The general architecture of these AC/DC adapters is that there are two power conversion stages. The first stage acts to control the adapters Power Factor and the second stage acts to regulate and isolate the output. In a typical design, the second stage consists of control circuit and a switch to control the connection of supply from the first stage to the second stage for output regulation as required by the load demand. A feedback signal (FB) of some kind is needed to allow the control circuit to sense the state of the output. This signal may be linear or hysteretic in nature. A linear FB signal is proportional, or inversely proportional to the output, a hysteretic FB signal has two states indicating a Switching/No Switching demand to the controller.

The controller then operates the power stage switch appropriately. Unfortunately, the generation of the FB signal is typically most lossy when the output is above the desired control setpoint, usually associated with operation at light load or no load. This is primarily due to the fact that the operating sense of the opto-coupler used to transfer the FB signal across the necessary isolation barrier is that, in the case of a linear FB signal, the current in the opto-coupler LED increases to its maximum when the output Voltage (Vo) is greater than the required regulation setpoint (Vset). In the case of a Hysteretic FB signal, the current in the opto-coupler LED is turned ON when the output Voltage (Vo) is greater than the required regulation setpoint (Vset). The net effect in both cases is that maximum LED current occurs at minimum load.

Obviously, current is needed to turn the LED on. The associated power loss would typically be 28 mW (for example 1.5 mA or so taken from a 19V output through an appropriate bias resistor) or almost 95% of the total standby power budget for a new design.

The opto-coupler configuration arises because when the output voltage is zero, as in a start-up event, the required state of the opto-coupler LED is OFF, which is the only available LED state because there is no power source available to set the LED ON. The default operation of the controller is then to initiate switching to increase the output voltage which is exactly what is needed to bring the system into regulation.

In order that features and advantages of the present invention may be further appreciated some embodiments will be described by way of example only and with reference to the accompanying diagrammatic drawings, of which:

BRIEF DESCRIPTION OF THE DRAWINGS

Further aspects of the invention will appear from the appending claims and from the following detailed description given with reference to the appending drawings.

DETAILED DESCRIPTION OF AN EXAMPLE EMBODIMENT

Figure 1:
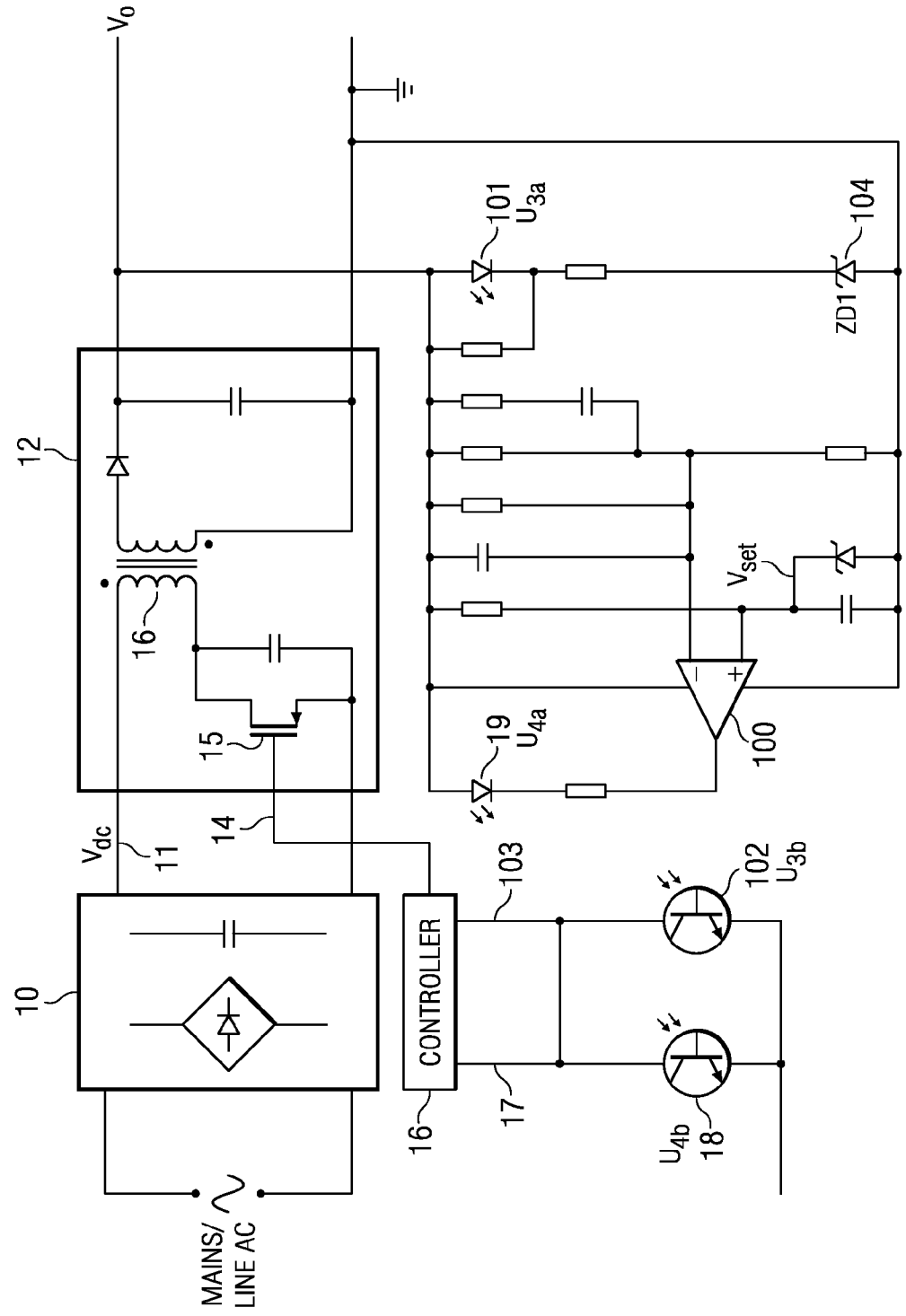
FIG. 1 is a schematic block diagram of a typical converter configuration.

In a typical adapter configuration (FIG. 1) a first stage 10 provides an intermediate dc voltage on an output 11 from a mains/line input of for example 240/110 volts. The first stage may be a power factor correcting stage but its precise function is not germane to the present invention. A second stage 12 provides regulation and is shown as a transformer coupled flyback stage, although this is just one of a number of types of second stage that could be employed. The salient requirement for the second stage is that it is capable of regulating the output (Vo) to a desired level as a load is applied and that it provides electrical isolation of the output from the intermediate voltage of for example some 90V DC.

Regulation is effected by applying a control signal 14 to a switch 15 which connects transformer primary winding 16 to the intermediate supply, thereby to supply more power to the secondary (output) side. A controller device or circuitry 16 generates the control signal 14 in response to a FB signal 17 indicative of whether the output voltage is above or below a desired voltage Vset. The FB signal 17 is received via an opto-coupler comprising a photo-transistor 18 and a light emitting diode (LED) 19 and is generated as follows.

The FB opto-coupler 18,19, U4 is driven by an operational amplifier 100 which amplifies the difference between a conditioned version of the output (Vo) and a desired voltage Vset such that current is present through LED 19 when Vo>Vset and absent when Vo<Vset. This FB is received by controller 16 which serves to control switch 15 to regulate the output voltage to a voltage corresponding to Vset, thus the current in the LED 19 is effectively set by the amplifier in such a way as to maintain Vo at Vset or an amount within regulation above it. If Vo drops below Vset, the opto-coupler current becomes zero. Zero current indicates that the Duty cycle should be increased to increase Vo.

The secondary side circuit includes a second opto-coupler comprising a LED 101 and a photo-transistor 102. This is provided for overvoltage protection (OVP).

The OVP opto-coupler (101, 102) is normally not driven. If an OVP event occurs then zener diode 104 will clamp and current will flow in LED 101 indicating an OVP event to the controller 16 on the primary side via photo transistor 102 and controller input line 103.

In such a scheme a difficulty arises during light load or no load operation when the output voltage (Vo) tends to be driven up by the switching action of the regulation stage and spends most of its time above Vset, falling only slowly due to unavoidable stray loads. One of these stray loads is itself the current in the opto-coupler LED, which is ON when Vo>Vset. The resulting 28 mW lost in the LED is therefore an irreducible minimum load preventing the design achieving the required performance.

Obviously, to reduce the standby power to a point where the whole converter meets the 30 mW target requires an alternative approach.

SUMMARY OF THE INVENTION

The present invention provides apparatus as set forth in the claims. According to the present invention a power converter includes a regulating isolation stage for providing a regulated output to a load on a secondary side thereof and a controller on a primary side, said controller being arranged to keep said output substantially in regulation by matching supply at the primary side to load demand on the secondary side;

a monitoring circuit receiving said output and a reference representing a regulation level said monitoring circuit generating a feedback signal indicative of said output relative to said reference;

a first coupler arranged to convey said feedback signal to said controller without compromising isolation;

a generator circuit arranged to generate a heartbeat signal whenever said secondary side is functional; and a second coupler arranged to convey said heartbeat signal to said controller without compromising isolation; wherein said first coupler is an opto-coupler comprising a light emissive device and a photo-sensitive device arranged such that the feedback signal drives the emissive device ON when said monitoring circuit indicates that the output is below the reference; and said controller increases said supply when the feedback signal so indicates and the heartbeat signal is present.

Preferably, the second coupling is an opto-coupler comprising a light emissive device and a photo-sensitive device. The second coupling coveys an over voltage protection signal from the secondary side to the controller. An overvoltage event may be conveyed by prolonged continuous current in the light emissive device of the second coupler, moreover the heartbeat signal may be a continuous current different from that conveying an overvoltage event. Alternatively, the heartbeat signal may be a pulse train.

The invention provides a scheme in which the sense of the opto-coupler is inverted with respect to the arrangement described above, i.e. opto-coupler LED ON for Vo<Vset and OFF for Vo>Vset.

Inverting the operating sense of the FB signal so that the opto-coupler LED is ON when Vo<Vset and OFF when Vo>Vset means that the LED current and power loss is zero during the times when Vo>Vset, as is normal case for many controllers at low or no load. Inverting the FB signal sense eliminates the LED power loss for this time. Additionally, as the LED no longer loads the output during this time, the proportion of time for which Vo>Vset is increased further, meaning that the timing at which the switch must again be on to meet demand is extended, producing a further power saving.

In order to implement this approach is necessary to take account of the fact that the FB LED is OFF under two different conditions. Firstly, during a start-up or when Vo is too low to turn the LED ON. The correct system response under this condition is to initiate switching in the regulation stage thereby increasing Vo. Secondly, when Vo>Vset. The correct system response here is to wait for Vo to fall below Vset. The regulation stage is not switched in this case. Thus for effective control, these conditions must be distinguishable, one from the other and in the present embodiment, this is achieved as follows.

A second coupling (opto or magnetic) additional to the one used for the FB signal is normally included in a design as part of an Over Voltage Protection (OVP) network. Conventionally this second opto-coupler is activated only to signal an OVP event which then triggers the controller to enforce a system shutdown. This second opto-coupler may be given the additional function of generating a 'heartbeat' signal when the system is up and running. The heartbeat signal allows the two conditions mentioned above to be distinguished one from the other.

The operating scheme is (a) if FB LED is OFF because Vo>Vset and HeartBeat signal is present: no regulation stage switching needed, or (b) if FB LED is OFF because Vo=0 and the HeartBeat signal is absent: regulation stage switching is needed.

It is envisaged that the heartbeat signal may take many forms and of those, the following have been successfully used to date.

A high current low duty cycle pulse train in the OVP LED for example a 10 usec pulse once every 10 msec or so. This may be generated by a simple low cost non precision oscillator. The controller latency is then 10 msec, which in the maximum time required for the system to distinguish a start-up condition and this added delay is normally acceptable.

A steady current in the OVP LED which is significantly lower than the LED current which signals an OVP event. This is potentially simpler than the pulsed approach. Distinguishing a low opto-coupler current from the OVP condition is relatively easy. Distinguishing the low steady current from the opto-coupler 'dark current' especially over variations with temperature, time and current transfer ratio requires careful design.

Figure 2:
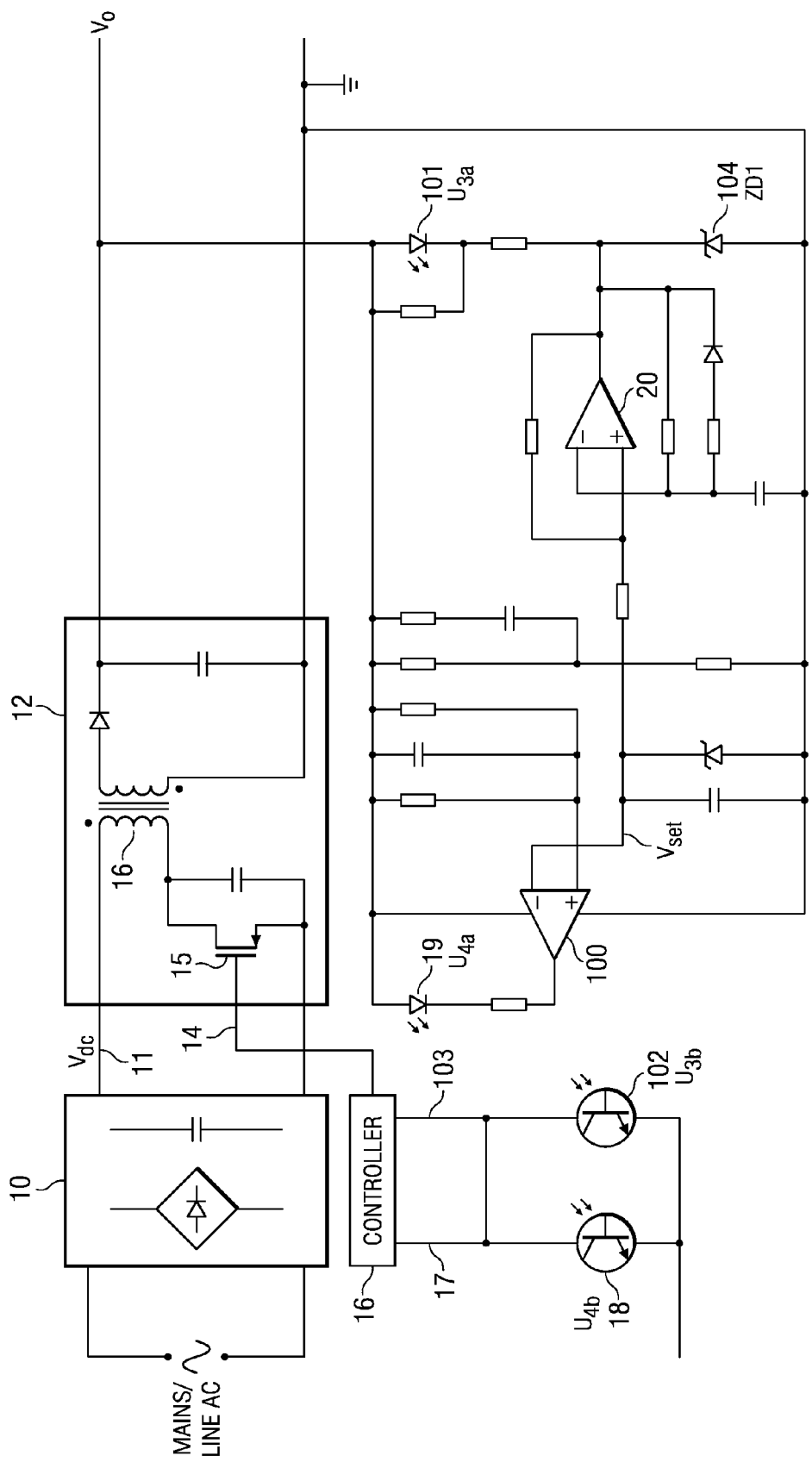
FIG. 2 is a schematic block diagram of a converter according to the present invention.

An exemplary embodiment of the present invention will now be described with reference to FIG. 2. Where parts are the same or equivalent to those of the arrangement of FIG. 1, common reference numerals have been used.

The FB opto-coupler (18,19) is driven by amplifier 100. It will be noted that when compared to the arrangement of FIG. 1, the input connections have essentially the opposite polarity, thus current is present in LED 19 when Vo<Vset and absent when Vo>Vset. In this embodiment, the OVP opto-coupler (101,102) is driven by the an heartbeat signal generated by a relaxation oscillator formed by operational amplifier 20 which pulses the LED 101 ON for, for example, about 10 usec once every 8 msec or so. The heartbeat signal may be detected by the controller 16 through the signal at 103. If an OVP event occurs then zener 104 will clamp and a steady current will flow in LED 101 indicating an OVP to the controller 16 on the primary via photo-transistor 102 and Line 103. The controller is arranged to distinguish the short signal from the DC level caused by the OVP signal and to effect control of switch 15 appropriately.

In some applications, the operational amplifier 100 may be replaced with a comparator so that the FB provided by the opto-coupler 18,19 is a demand/no demand signal corresponding respectively to current in LED 18/no current in LED 18. Moreover the network driving the second coupling may be arranged to monitor general functionality on the secondary side and to inhibit the heartbeat signal if the secondary side appears non-functional or mal-functional since in event of cessation of the heartbeat signal, controller 16 may be arranged to close down or restart.

What is claimed is:

1. A power converter including a regulating isolation stage for providing a regulated output to a load on a secondary side thereof and a controller on a primary side, said controller being arranged to keep said output substantially in regulation by matching supply at the primary side to load demand on the secondary side;
    a monitoring circuit receiving said output and a reference representing a regulation level, said monitoring circuit generating a feedback signal indicative of said output relative to said reference;
    a first coupler arranged to convey said feedback signal to said controller without compromising isolation;
    a generator circuit arranged to generate a heartbeat signal whenever said secondary side is functional; and
    a second coupler arranged to convey said heartbeat signal to said controller without compromising isolation; wherein
    said first coupler is an opto-coupler comprising a light emissive device and a photo-sensitive device arranged such that the feedback signal drives the emissive device ON when said monitoring circuit indicates that the output is below the reference; and said controller increases said supply when the feedback signal so indicates and the heartbeat signal is present.

2. A power converter as claimed in claim 1 and wherein the second coupler is an opto-coupler comprising a light emissive device and a photo-sensitive device.

3. A power converter as claimed in claim 1, and wherein second coupler coveys an over voltage protection signal from the secondary side to the controller.

4. A power converter as claimed in claim 2, and wherein second coupler coveys an over voltage protection signal from the secondary side to the controller.

5. A power converter as claimed in claim 3, and wherein an overvoltage event is conveyed by prolonged first continuous current in the light emissive device of the second coupler.

6. A power converter as claimed in claim 4, and wherein an overvoltage event is conveyed by prolonged.

7. A power converter as claimed in claim 1, and wherein the heartbeat signal is a pulse train.

8. A power converter as claimed in claim 2, and wherein the heartbeat signal is a pulse train.

9. A power converter as claimed in claim 3, and wherein the heartbeat signal is a pulse train.

10. A power converter as claimed in claim 4, and wherein the heartbeat signal is a pulse train.

11. A power converter as claimed in claim 5, and wherein the heartbeat signal is a pulse train.

12. A power converter as claimed in claim 6, and wherein the heartbeat signal is a pulse train.

13. A power converter as claimed in claim 1, and wherein the heartbeat signal is a continuous current.

14. A power converter as claimed in claim 2, and wherein the heartbeat signal is a continuous current.

15. A power converter as claimed in claim 3, and wherein the heartbeat signal is a continuous current.

16. A power converter as claimed in claim 4, and wherein the heartbeat signal is a continuous current.

17. A power converter as claim in claim 5, wherein the heartbeat signal is a second continuous current.

* * * * *